(12) United States Patent
Kalil

(10) Patent No.: US 10,926,838 B2
(45) Date of Patent: *Feb. 23, 2021

(54) BOAT AFT COCKPIT EXTENSION

(71) Applicant: Anthony Kalil, Palm City, FL (US)

(72) Inventor: Anthony Kalil, Palm City, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/577,709

(22) Filed: Sep. 20, 2019

(65) Prior Publication Data

US 2020/0130781 A1 Apr. 30, 2020

Related U.S. Application Data

(60) Provisional application No. 62/734,689, filed on Sep. 21, 2018, provisional application No. 62/791,488, filed on Jan. 11, 2019, provisional application No. 62/860,447, filed on Jun. 12, 2019.

(51) Int. Cl.
*B63B 3/46* (2006.01)
*B63B 1/08* (2006.01)
*B63B 3/56* (2006.01)
*B63B 1/12* (2006.01)
*B63B 3/14* (2006.01)

(52) U.S. Cl.
CPC ............... *B63B 3/46* (2013.01); *B63B 1/08* (2013.01); *B63B 1/125* (2013.01); *B63B 3/14* (2013.01); *B63B 3/56* (2013.01)

(58) Field of Classification Search
CPC .... B63B 3/46; B63B 3/14; B63B 3/56; B63B 1/08; B63B 1/125; B63B 83/00
See application file for complete search history.

(56) References Cited

U.S. PATENT DOCUMENTS

| 148,957 | A | * | 3/1874 | Jackson | B63B 1/08 |
| | | | | | 114/57 |
| 3,726,245 | A | * | 4/1973 | Critcher | B63B 13/00 |
| | | | | | 114/61.1 |
| 9,394,032 | B1 | * | 7/2016 | Pigeon | B63B 1/08 |
| 10,124,859 | B2 | * | 11/2018 | Burnett | B63H 20/02 |
| 2009/0227157 | A1 | * | 9/2009 | Mochizuki | B63H 20/02 |
| | | | | | 440/53 |
| 2011/0107954 | A1 | * | 5/2011 | Schaefer, Jr. | B63B 1/16 |
| | | | | | 114/289 |
| 2011/0232557 | A1 | * | 9/2011 | Kilgore | B63B 1/08 |
| | | | | | 114/271 |
| 2020/0130786 | A1 | * | 4/2020 | Ekern | B63B 29/04 |

* cited by examiner

*Primary Examiner* — Stephen P Avila
(74) *Attorney, Agent, or Firm* — Saliwanchik, Lloyd & Eisenchenk

(57) ABSTRACT

A cockpit extension that extends aft of a boat transom for increasing the afterdeck area of the boat. The cockpit extension includes a deck that can be accessed from the afterdeck of the boat and an under-face beneath the deck that can be above or below the water-line of the boat. The cockpit extension can also include one or more of a gunwale, inner bulkhead, and outer freeboard. A running surface can also be provided on the under-face that improves the backing down process of the boat. The boat has at least two outboard engines, attached on the port and starboard sides of the boat transom, respectively.

20 Claims, 12 Drawing Sheets

BOAT AFT COCKPIT EXTENSION

CROSS-REFERENCE TO RELATED APPLICATIONS

This application claims the benefit of U.S. Provisional Application Nos. 62/734,689, filed Sep. 21, 2018; 62/791,488, filed Jan. 11, 2019; and 62/860,447, filed Jun. 12, 2019; all of which are hereby incorporated by reference in their entirety.

BACKGROUND OF INVENTION

Historically, outboard powered deep "V-hull" boats have been a very popular segment of the boating industry, particularly for smaller deep V-hull boats, from 15 to 30 feet in length. The outboard engine offers features such as simplicity, weight savings over other types of power systems for boats, and the ability to tilt the outboard engines completely out of the water, which provides anti-corrosion benefits, making outboard powered V hull boats more advantageous than other types of smaller deep V-hull style boats. Recently, technologies have been developed that have dramatically increased the horsepower available in outboard engines. While 300 horsepower was close to the maximum output of an outboard engine only a few years ago, technologies such as increased displacement and superchargers has allowed outboard engines to now offer over 650 horsepower each, which is the required horsepower for larger boats and yachts up to 65 feet. Now, larger boats can offer the addition of the benefits of simplicity, anti-corrosion, and tilt-ability that outboards provide.

While the multi-engine outboard deep V-hull boat design has many advantages over a multi-engine inboard or sterndrive deep V-hull boat design, it also has several disadvantages. For example, while the outboard engines provide performance and ease of maintenance, they negatively affect the usable afterdeck space at the stern of the boat in many ways.

In a stern drive or inboard multi engine design, the engines are buried beneath the aft cockpit floor, allowing the cockpit to extend all the way to the back of the boat, and on top of the engines. This wide open aft cockpit is completely open for the designers to incorporate platforms designed for sunning or lounging, swimming and diving from fixed or lowering platforms that intersect with the water, skiing platforms that allow skiers or wake surfers to safely engage the transom of the boat without contacting propellers, and, perhaps most importantly, accessing the aft cockpit of the boat from the dock. When a boat is stern-tied in a marina, oftentimes, the only access passengers have for boarding is from the transom.

Outboard powered deep V boats historically have one, two, three, or four outboard engines attached along the transom, usually as near to centerline as possible. The physical size of the engines has increased as the horsepower has increased, and the width and height of multiple outboard engines along the transom greatly limits access to the space remaining at the stern of the boat, which is now usually on the sides of the engines farthest from the centerline in twin or 3 engine examples. However, the engines do not only require space in height and width, but depth into the cockpit as well. The engines require clearance to allow them to swing up and out of the water since the top powerhead of each engine leans into the boat. On all outboard powered boats, this required space for tipping up the engines consumes a considerable amount of usable aft cockpit length. Sunpads, or social aft cockpits that are common and popular features on inboard and sterndrive powered boats are compromised by the sight and amount of space required for the engines to tilt, whereas inboard and stern drive propulsion boats can place the aft cockpit close to the water, and all the way aft to the end of the boat, giving passengers unlimited access to the water for fishing, casting, swimming, diving, sunning, and boarding. While the multi-outboard design offers many advantages in propulsion and ease of maintenance, the foregoing and other aspects of the boat design suffer to accommodate the outboard engines, especially the aft cockpit usable deck space.

In situations where a boat is moored with a dock astern of the boat, the only access to board the boat may be across the stern or over the transom. Many traditional stern drive or inboard powered boats feature a molded-in aft boarding platform or a "passarella," which is a retractable gang plank that extends from the stern to the dock to allow boarding. Since sterndrive boats do not require a mechanical space or splashwell at the rear of the boat, nor do the engines extend up on the exterior of the boat, the aft cockpit can extend all the way aft to house the swim platform, boarding platform, or passarella. Multi-engine outboard boats, particularly those with 4 or 5 engines that span the width of the transom, do not allow for the incorporation of a swim platform, boarding platform, or passarella at the stern since the outboards and the splashwells required to allow for tilting them up occupy all of available width of the boat.

This leaves little room for accessing the aft of the boat, with the exception of small platforms or extensions that may protrude from the sides of the engines. While these extensions could be used for boarding, their dangerous proximity to the propellers and sharp underwater gear of the engines makes them less than ideal for boarding the boat. Additionally, these small extensions are also aft of the main cockpit of the boat, so they are unusable while the boat is underway, and the lack of any gunwales or side protection makes them dangerous to use due to their proximity to the propellers. In most cases, boarding from the sides of the boat are the preferred methods, as the stern access is severely limited.

Traditional inboard powered sport-fishing yachts with the engines under the cockpit floor utilize the open aft cockpit for fishing. The aft cockpit of the boat at the transom is utilized to catch and reel in fish for sport, leisure, or commercial purposes. The open aft cockpit extends to the aftermost length of the boat, because it makes an ideal place to cast fishing lines out, and also reel in and retrieve the fish, while offering the occupants the full protection of the high gunwales surrounding the cockpit. Fighting chairs, or seats specifically designed to mount a fishing rod, are aimed aft in order to allow the angler to "back down" on the fish by engaging the engines in reverse. Trolling is another method of catching fish where the boat tows several baits in order to attract attention of game fish. Once the fish is on the hook, the angler on an inboard powered boat traditionally fights the fish from the aft cockpit by keeping it behind the boat and backing down on it. These methods of fishing are greatly compromised in a multi engine outboard fishing yacht where the aft cockpit is compromised by the large physical size of the outboard engines, as well as the splashwells and mechanical space required for the outboards. The compromised cockpit design of outboard powered fishing boats diminishes the ability of the angler to cast over the engines, and requires the angler to fight the fish from the side of the boat, since it is very difficult to back down on the fish for several reasons. First, backing down on the fish can cause the fishing line to be cut if it gets tangled in the propellers.

Second, it is very difficult to reach the fish, as the usable aft cockpit is too far away from the stern end of the boat, and the engines are too large to reach over and are often too closely spaced to retrieve the fish from between the engines.

It is clear that the usable cockpit space previously available at the stern of an inboard or sterndrive powered boat is partially or completely blocked by use of outboard engines. While the modern increased power and reliability of the outboard engine has contributed to the design of large deep V boats and yachts, it has compromised the usable cockpit design at the same time.

Outboard engines are usually very vulnerable to damage from the rear, as they are exposed at the aft end of the hull. The engines are vulnerable to striking docks, other vessels, and seawalls from docking accidents, drifting, or mooring mishaps due to tide changes. Some hull designs offer small extensions to the sides of the hull that may offer minimal protection from bumping the engines at the sides, however, any protection from a direct rear impact or contact is inadequate. Additionally, trimming the engines up exposes the propellers and other delicate portions of the engine, and extends them even further aft, which creates both a danger hazard to occupants of other vessels, and a damage hazard to the uptrimmed engines, when contacting a dock or piling from the rear.

In summary, the afterdeck cockpit space of outboard engine powered boats is compromised because of the outboard engines. Designs that provide more usable cockpit area that allows occupants to fish, dive, swim, or board the boat from the stern without adversely affecting the use or performance of the outboard engines are desirable.

BACKGROUND ART

There are several designs of boats that offer limited access to the stern of the boat through spacing designed between the engines. In all cases, a floor extension or platform is extended between the engines.

In the case of the PowerPlay Boat (FIG. 14), the design teaches that the floor aft of the cockpit (represented by the termination of the seats- and therefore not an area that can be utilized while under motion) extends between the twin engines, and a ladder is mounted to board the boat between the engines. However, this design does not allow the occupants to safely ride aft of the engines, nor utilize the platform while underway, since the cockpit still stops in front of the engines. U.S. Coast Guard regulations require that occupants are only allowed to ride in boats where there is a dedicated safe area to ride, with adequate hand holds and protection from being ejected from the boat. Additionally, the ladder does not extend past the engines, so a misstep on the ladder may cause the occupant to fall directly into the propellers.

In the case of boats offered by Yamaha, the designs also teach that you can access the boat from between the engines, however, in both the Yamaha SR330 and the Yamaha SR320FB the design is distinctly different from that of the subject invention.

The Yamaha SR320FB cockpit (FIG. 12) can be clearly seen stopping forward of the engine platform, which is at a lower level. Also, a seat is arranged forward of the center of the platform, which requires opening before stepping down onto the platform. Clearly, an occupant must leave the cockpit of the boat to step down onto the platform. The platform is thereby not able to be utilized while underway.

The Yamaha SR330 (FIG. 13) is similar to the SR330FB, however, it has the platform at the same level as the cockpit floor. This design also clearly shows that the cockpit terminates forward of the platform, and that one must exit the cockpit through the center door to board and utilize the platform.

All of these designs are different to the subject invention, where the cockpit sides or gunwales and optionally an aft access door extend or are located aft of the engine transom plane to extend the usable aft cockpit. This allows the occupants to ride safely aft of the transom plane, which increases usable cockpit space, and allows fighting of fish from safely inside the cockpit, including at points even with or aft of the outboard engines.

BRIEF SUMMARY

The subject invention successfully addresses the above described disadvantages associated with the use of transom-mounted outboard engines on V-hull boats and provides improvements and advantages, which heretofore have not been available on such boats. In particular, the subject invention provides novel and highly effective methods and devices for increasing the afterdeck cockpit area of a boat without adversely affecting the operation of the outboard engines.

In accordance with the invention, additional afterdeck area is provided by a cockpit extension. The typically closely-mounted outboard engines are moved apart towards the port and starboard sides of the boat transom, so that a cockpit extension can be provided in the area between the separated engines.

The cockpit extension can be integrally molded to form a unitary structure, or it can be attached to the structure.

The deck of the cockpit extension can be continuous with the afterdeck of the boat and can extend any distance to the aft of the plane of the transom. Thus, the cockpit extension is accessible from at least the afterdeck area. The freeboard and gunwales of the boat can be integrally extended to the cockpit extension to provide freeboard and gunwales that partially or fully enclose the deck of the cockpit extension. The freeboard and gunwales can also be attached to a platform already extending past a transom. A cockpit extension can also afford an alternative location for boarding a boat and can include an entry, such as an aft boarding door or open walkway bordered by a combination of freeboard, inner bulkhead, and gunwales.

The under-face of the cockpit extension can be configured at any height on the plane of the transom, relative to the water line. Thus, the under-face of the cockpit extension can be above, below, or level with the water line. Furthermore, the boat hull can be incorporated with the under-face of the cockpit extension to form a continuous hull with the cockpit extension or the cockpit extension can be on a different plane than the boat hull. Advantageously, the under-face can be configured with at least one inclined plane that serves to engage the water and raise the rear of the hull during backdown of the boat and inhibit "digging in" of the stern.

This Brief Summary is provided to generally introduce the reader to one or more select concepts described below in the Detailed Disclosure in a simplified form. This Summary is not intended to identify key and/or required features of the claimed subject matter. Other aspects and further scope of applicability of the present invention will also become apparent from the detailed descriptions given herein. It should be understood, however, that the detailed descriptions, while indicating preferred embodiments of the invention, are given by way of illustration only, since various changes and modifications within the spirit and scope of the invention will become apparent from such descriptions. The invention is defined by the claims below.

BRIEF DESCRIPTION OF DRAWINGS

In order that a more precise understanding of the above recited invention can be obtained, a more particular description of the invention briefly described above will be rendered by reference to specific embodiments thereof that are illustrated in the appended drawings. The drawings presented herein may not be drawn to scale and any reference to dimensions in the drawings or the following description is specific to the embodiments disclosed. Any variations of these dimensions that will allow the subject invention to function for its intended purpose are considered to be within the scope of the subject invention. Thus, understanding that these drawings depict only typical embodiments of the invention and are not therefore to be considered as limiting in scope, the invention will be described and explained with additional specificity and detail through the use of the accompanying drawings in which.

DETAILED DISCLOSURE

Figure 1:
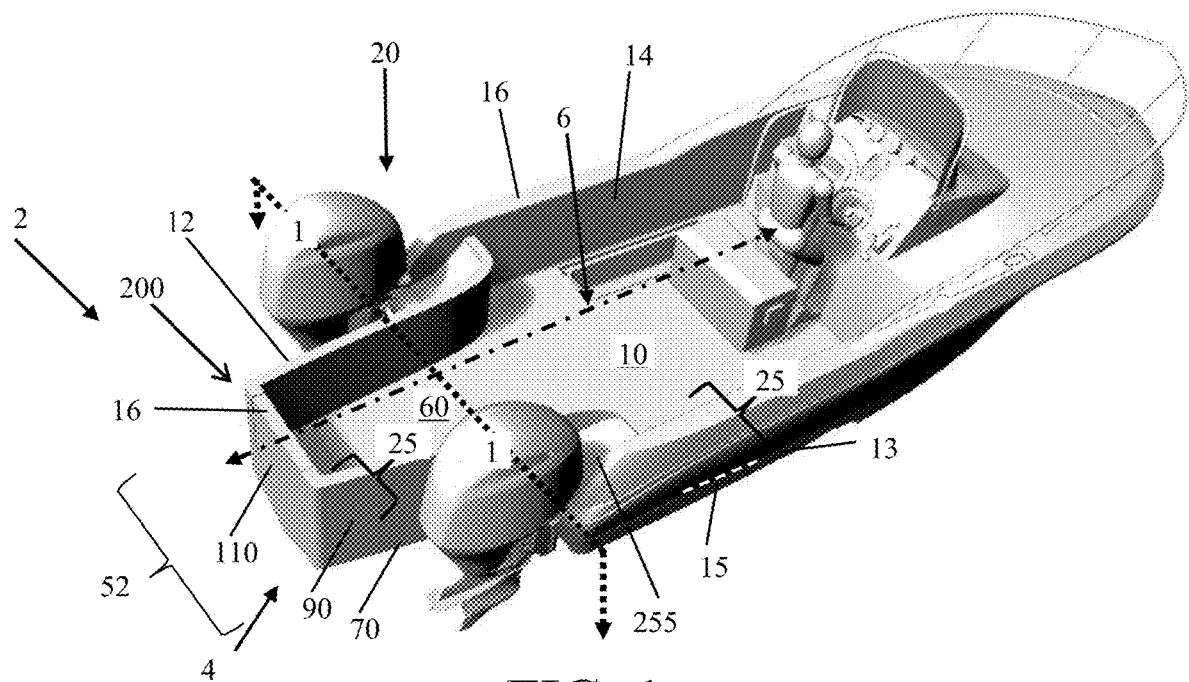
FIG. 1 is an illustration of the stern end of a boat with a cockpit extension, according to an embodiment of the subject invention.

The subject invention pertains to an improvement to boats powered by two or more outboard engines mounted on the boat transom. More specifically, the subject invention provides embodiments of a cockpit extension that provide additional area to the afterdeck around the outboard engines without adversely affecting the operation of the engines or the boat.

The following description will disclose that the subject invention is particularly useful for boats having two or more transom-mounted outboard engines. A person with skill in the art, however, will recognize numerous other uses that would be applicable to the devices and methods of the subject invention. Thus, while the subject application describes, and many of the terms herein relate to, a boat having a transom and outboard engines secured thereto, other modifications apparent to a person with skill in the art and having benefit of the subject disclosure are contemplated to be within the scope of the present invention.

In the description that follows, a number of terms relating to boats are utilized. Many of the terms are standard in the art, but others relate specifically to the subject invention. In order to provide a clear and consistent understanding of the specification and claims, including the scope to be given such terms, the following definitions are provided.

As used herein, "afterdeck" refers to the area of the boat deck at the aft end of the boat, aft of the controls console and forward of the transom.

As used herein, "cockpit" refers to that area of the afterdeck enclosed or defined by any of raised inner bulkhead and/or gunwales and/or aft-most seats.

Also as used herein "transom plane" refers to a plane that includes a transom configured for attachment of an outboard engine and is perpendicular to the boat midship.

In addition, as used herein, "open transom" refers to an area on the boat transom that is not occupied by an outboard engine. More specifically, the phrase refers to an area of the transom between or to the port and/or starboard side of the outboard engines mounted on the boat transom. The transom area can have or can be made to have an opening to facilitate movement between the afterdeck and the deck extension.

"Running Surface" refers to the surface of a boat's hull that contacts the water while the boat is in motion or underway when on plane in a forward direction, generally when moving above 15 mph.

The term "top side," as used herein refers to anything on the boat that is on or above the deck of the boat or the deck of the cockpit extension. Likewise, as used herein, the term "bottom side" refers to anything that is below the deck of the boat or the deck of a cockpit extension.

It should be understood that the use of "and/or" is defined inclusively such that the term "a and/or b" should be read to include the sets: "a and b," "a or b," "a," and "b."

Furthermore, the terms "about" or "approximately," as used herein, are defined as at least close to a given condition, value, or either end of a range as is necessary to cover manufacturing variances, equipment tolerances, and normal variances in material, as understood by those skilled in the art.

It should also be understood that, as used herein, and unless otherwise specifically stated, the terms "operable communication," "operable connection," "operably connected," "cooperatively engaged," and grammatical variations thereof mean that the particular elements are connected in such a way that they cooperate to achieve their intended function or functions. The "connection" or "engagement" may be direct or indirect, physical or remote.

The figures and descriptions of embodiments of the present invention have been simplified to illustrate elements that are relevant for a clear understanding of the invention, while eliminating, for purposes of clarity, other elements that may be well known. Those of ordinary skill in the art will recognize that other elements may be desirable and/or required in order to implement the present invention. However, because such elements are well known in the art, and because they do not facilitate a better understanding of the present invention, a discussion of such elements is not provided herein.

The present invention is more particularly described in the following examples that are intended to be illustrative only because numerous modifications and variations therein will be apparent to those skilled in the art. As used in the specification and in the claims, the singular for "a," "an" and "the" include plural referents unless the context clearly dictates otherwise.

Reference will be made to the attached Figures on which the same reference numerals are used throughout to indicate the same or similar components. With reference to the attached Figures, which show certain embodiments of the subject invention, it can be seen in FIGS. 1-10 that a cockpit extension 200 of the subject invention comprises a deck 60 on the topside 2 and an under-face 70 on the hull beneath the deck 60, which can have a running surface 8 (FIGS. 9A and 9B) on the bottom side 4. Other embodiments can include an inside bulkhead 14, an outer freeboard 12, a gunwale 16 and, optionally, an entryway 110 on the cockpit extension. Each of these and other components will be discussed in detail below.

Initially, there are two methods by which a cockpit extension 200 can be operably connected to a boat. The first is to manufacture the boat and cockpit extension together, so they are integrated and form a monolithic structure as in FIGS. 5A and 5C. With this method, the cockpit extension is incorporated into the boat mold(s) and is manufactured simultaneously with and molded or formed to be integral with the other boat components. The other method is for the cockpit extension to be an "add-on" or "bolt-on" component to an existing boat. With this method, the cockpit extension can be a fully or partially complete structure configured for operable connection to an existing boat. This method can also require that the existing boat be at least partially modified to receive the cockpit extension on an open transom area formed in the boat transom. This can include forming an opening in the transom that can facilitate movement between the afterdeck and the deck of the cockpit extension. The embodiments described herein are applicable to any cockpit extension, whether incorporated with or added onto a boat.

In one embodiment, outboard engines are separated towards the port and starboard sides of the boat. This can provide open transom at the boat midship 6 between the engines. With this arrangement of the engines, a cockpit extension 200 can be positioned in the midship open transom to extend aft of the boat transom 255. FIGS. 1-7 illustrate non-limiting examples of cockpit extensions arranged midship, between engines separated to the port and starboard sides mounted on the boat transom 255.

Figure 7B:
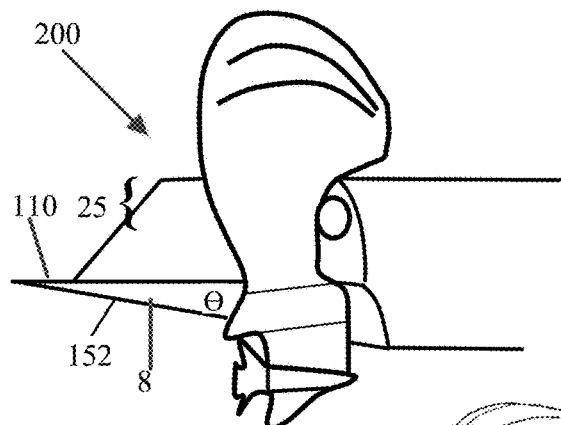
FIG. 7B illustrates a side view of the stern of a boat having a lower surface with a reverse incline surface, where the angle θ formed by the lower surface and true horizontal opens towards the transom to form a wedge-shaped running surface.
Figure 7A:
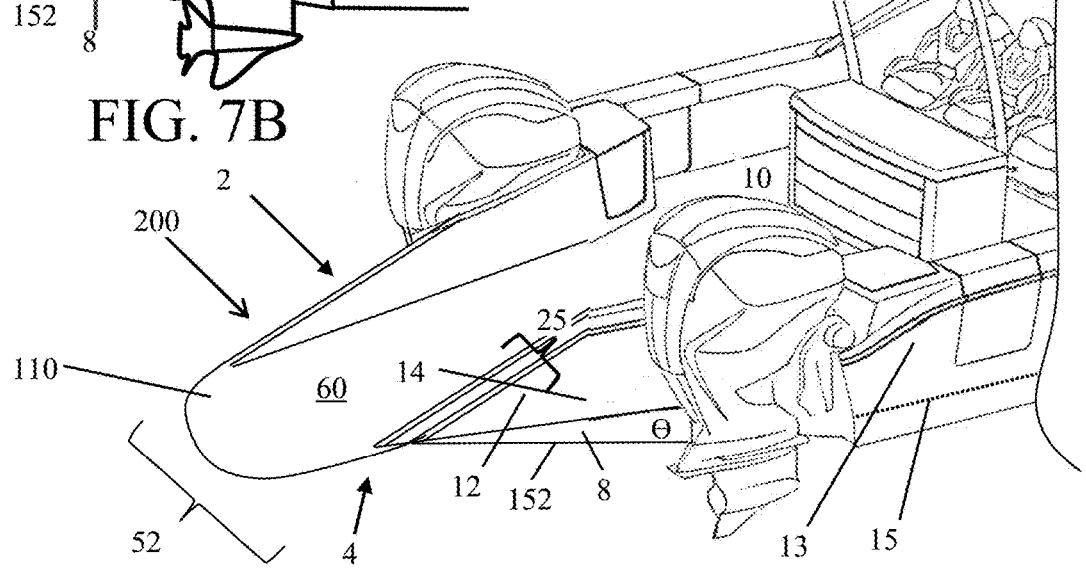
FIG. 7A illustrates the stern of a boat with an alternative embodiment of a cockpit extension, according to the subject invention, where the boat hull and gunwales extend partially around the deck extension to form an extended cockpit. Effectively, the cockpit sides extend past the transom plane and are illustrated here as extending aft of the outboard engines. Also shown is an embodiment of a reverse inclined surface on the under-face of the cockpit deck extension.
Figure 16:
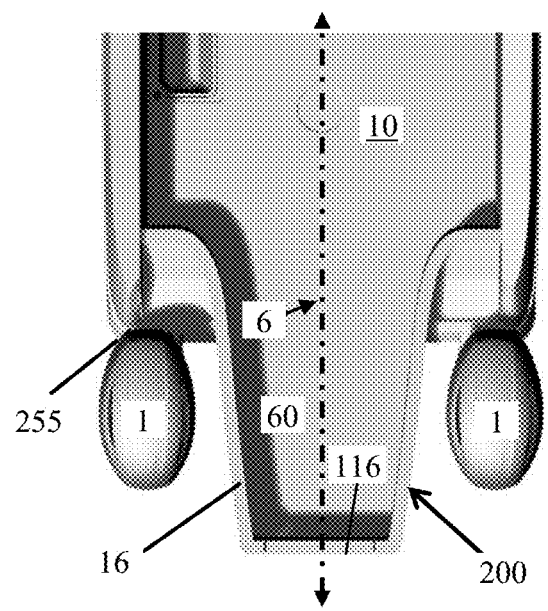
FIG. 16 is a top side plan view of a boat with a cockpit extension, according to an embodiment of the subject invention. In this embodiment, the cockpit extension and gunwales extend aft tapering to a narrower width at the aft-most point.
Figure 17:
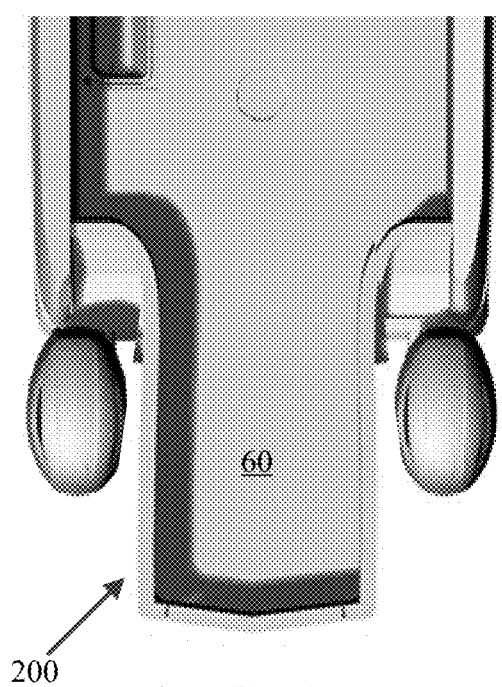
FIG. 17 is a top side plan view of a boat with a cockpit extension, according to an embodiment of the subject invention. In this embodiment, the cockpit extension and gunwales extend aft parallel to one another to form a constant width extended cockpit.

The periphery 52 of a cockpit extension 200 can assume any of a variety of advantageous shapes. FIG. 16 illustrates an embodiment where the cockpit extension, when viewed from the top side, has a tapered shape that narrows towards the stern. FIG. 17 illustrates an embodiment where the sides of the cockpit extension are approximately parallel, providing a quadrilateral-shaped periphery. FIGS. 7A and 7B illustrate a cockpit extension with a semi-circular shaped stern, and defined by inner bulkheads, outer freeboards, and gunwales extending aft of the outboard engines. Other embodiments can include a cockpit extension with a flared stern, such that it is wider at the aft end, which is not shown, but would be understood by a person of skill in the art. Other shapes can also be employed for the periphery that provide advantages for various purposes. Thus, the invention is not limited to a cockpit extension having only a quadrilateral-shaped periphery 52.

Figure 2A:
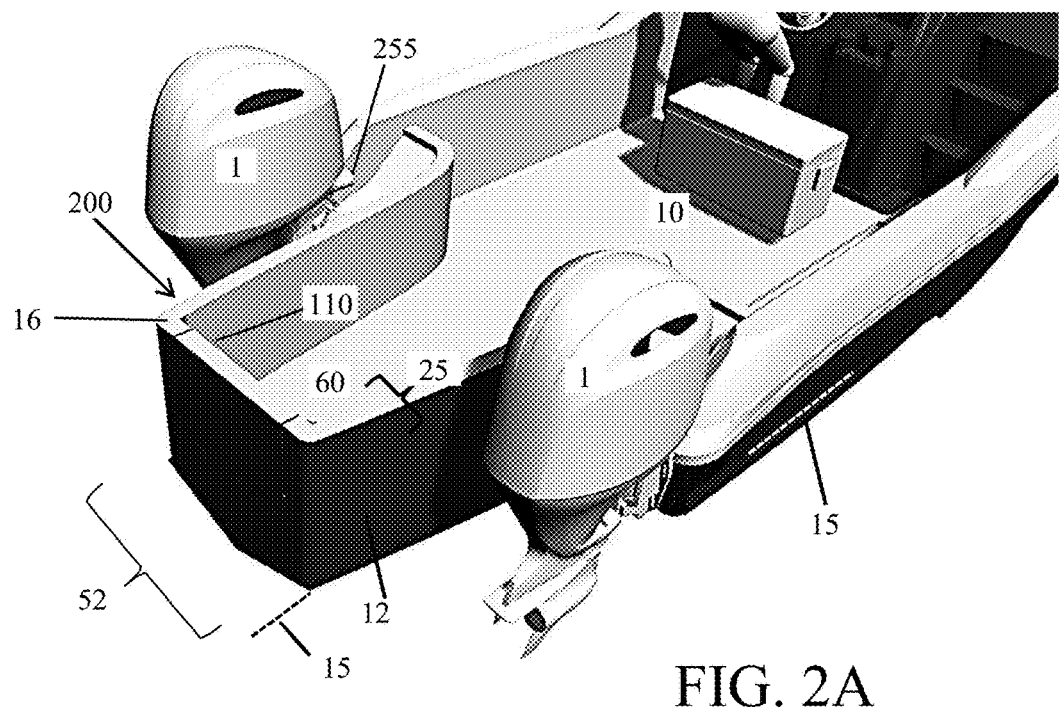
FIG. 2A is an illustration of the stern end of a boat with a cockpit extension, according to an embodiment of the subject invention. In this embodiment, the under-face of the cockpit extension is shaped with a V, and is approximately level with the water line of the boat.
Figure 2B:
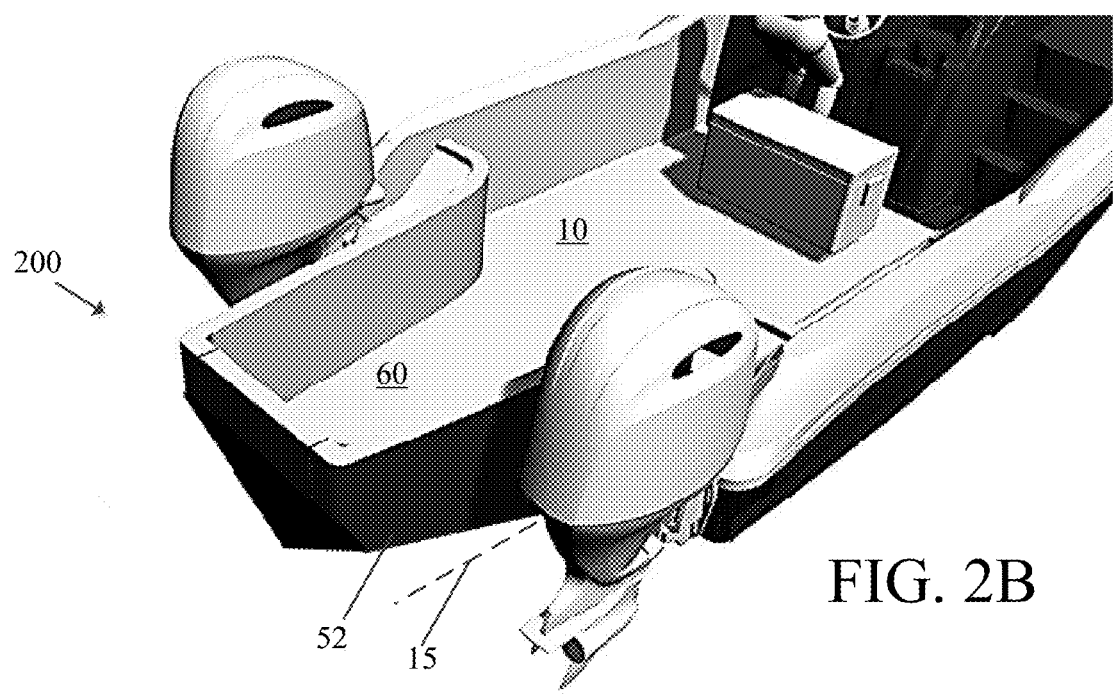
FIG. 2B is an illustration of the stern end of a boat with a cockpit extension, according to an embodiment of the subject invention. In this embodiment, the under-face of the cockpit extension is shaped with a V, and is inclined with respect to the water line of the boat.
Figure 2C:
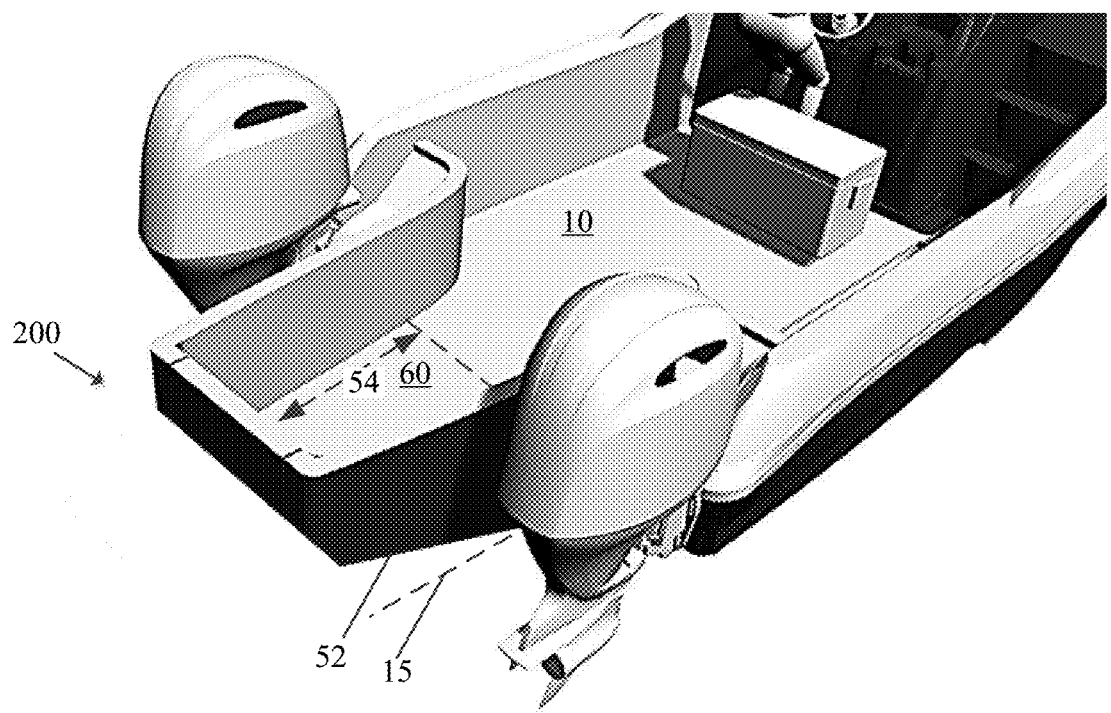
FIG. 2C is an illustration of the stern end of a boat with a cockpit extension, according to an embodiment of the subject invention. In this embodiment, the under-face of the cockpit extension is flat and is inclined with respect to the water line of the boat.
Figure 2D:
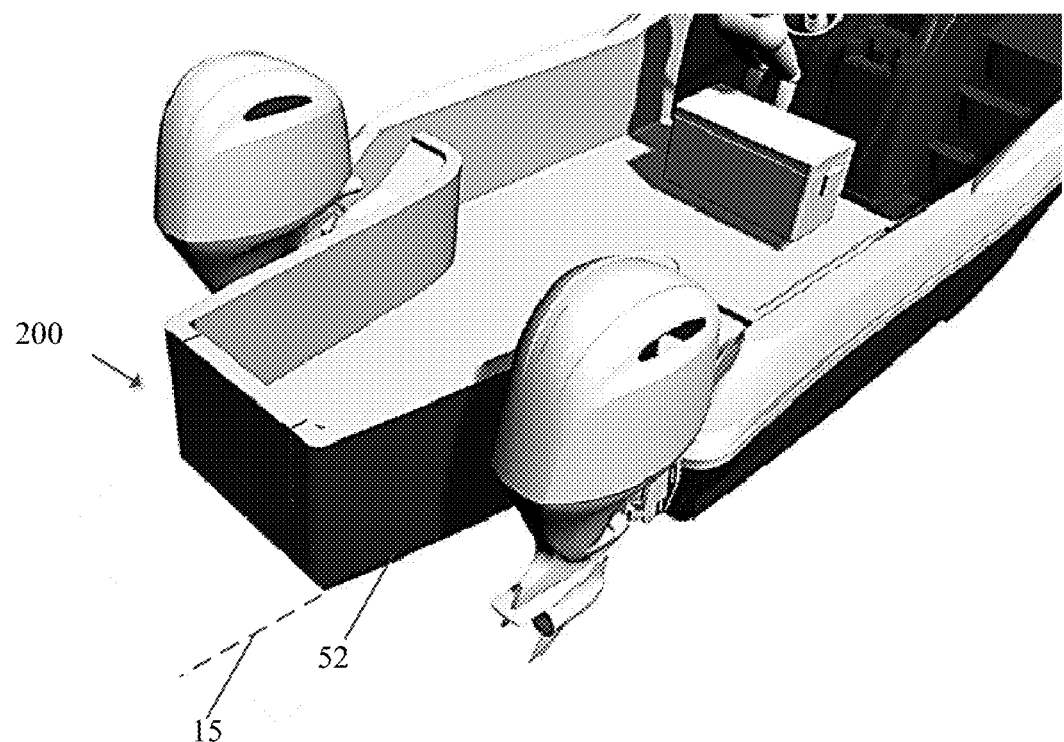
FIG. 2D is an illustration of the stern end of a boat with a cockpit extension, according to an embodiment of the subject invention. In this embodiment, the under-face of the cockpit extension is flat and is approximately level with the water line of the boat.
Figure 3:
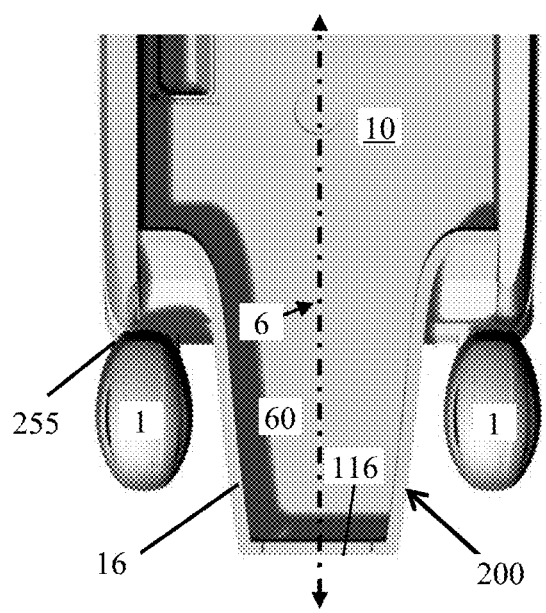
FIG. 3 is a top side plan view of a boat with a cockpit extension, according to an embodiment of the subject invention. In this embodiment, the boat hull and gunwales extend around to form an enclosed deck extension with an aft boarding door in the closed position.
Figure 4:
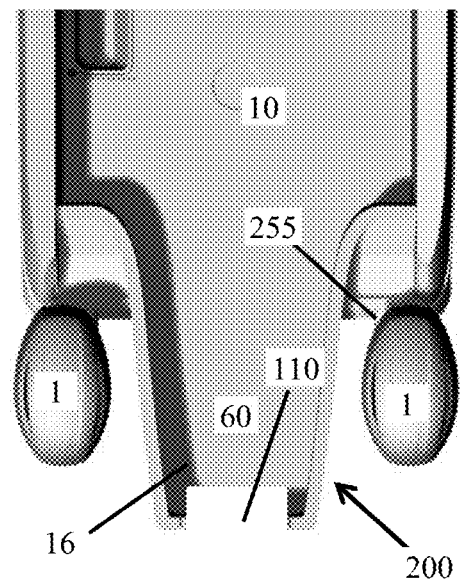
FIG. 4 is a top plan view of a boat with a cockpit extension, according to an embodiment of the subject invention. In this embodiment, the boat hull and gunwales extend partially around the deck extension, providing a stern entryway.
Figure 18:
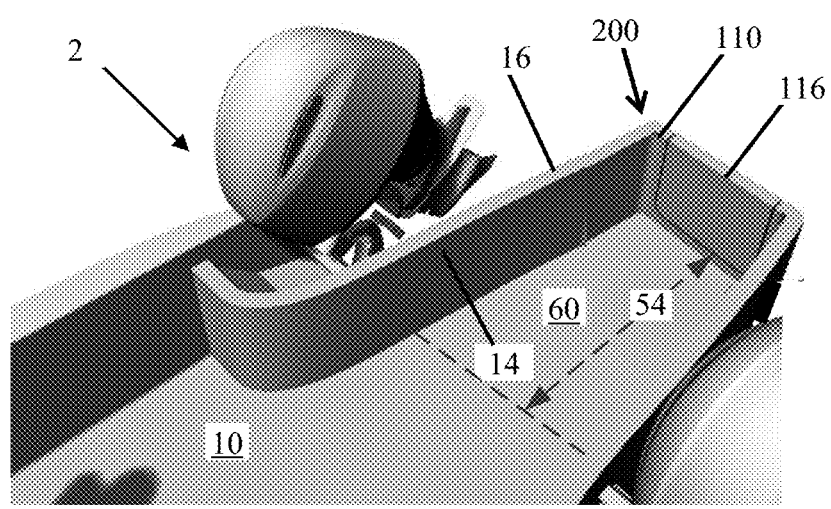
FIG. 18 is an illustration showing the stern of a boat with a cockpit extension, according to embodiments of the subject invention. In this embodiment, the deck extension extends past the length of the up-trimmed engines to provide protection.

The aft length 54 of a cockpit extension 200 can vary with the length of the boat, the size and number of the outboard engines, the position on the transom, the location relative to the boat water line, the shape of the periphery of the cockpit extension, and other factors known to those of skill in the art. In one embodiment, the aft length of a cockpit extension extends beyond the aft-most surface of an outboard engine 1 in a full down-tilted position, as can be seen in FIG. 2C. In other embodiments, the aft length of a deck extension can extend beyond the aft-most surface of an outboard engine in a full up-tilted position, as can be seen in FIG. 18. More specifically, a cockpit extension can have an aft length of 1', 2', 3', 4', 5', 6', 7', 8', 9', and 10' or an aft length 54 greater than or between any two of the listed values.

Figure 5A:
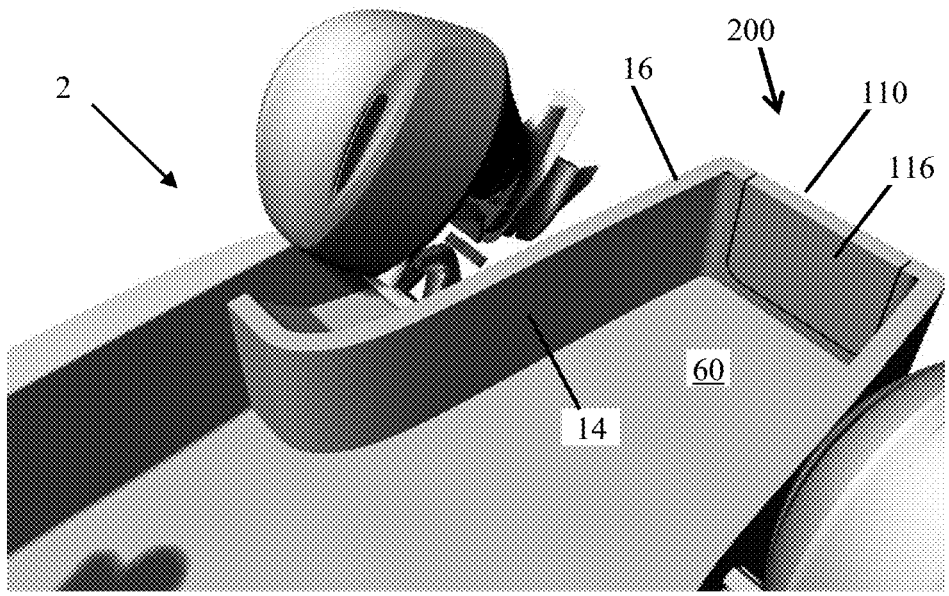
FIG. 5A is an illustration of the stern of a boat with an integral cockpit extension, according to an embodiment of the subject invention. In this embodiment, an enclosed cockpit extension has a level floor and an opening for boarding through the cockpit extension. Also shown is an optional aft boarding door to close the opening.
Figure 5B:
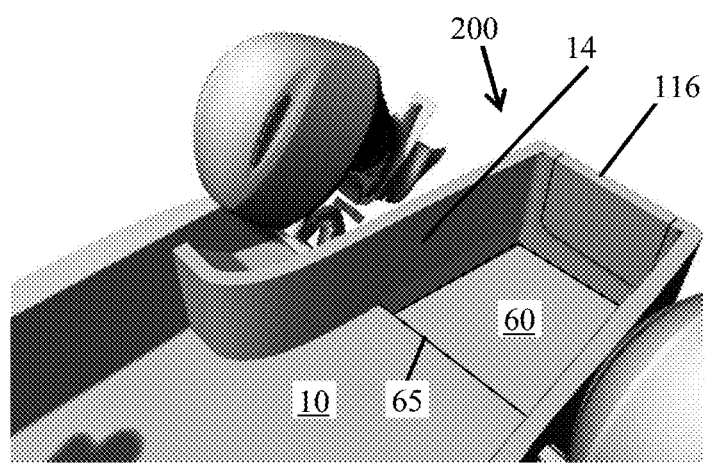
FIG. 5B is an illustration of the stern of a boat with an integral cockpit extension, according to an embodiment of the subject invention. In this embodiment, an enclosed cockpit extension has a step down from the cockpit floor and an opening for boarding through the cockpit extension. Also shown is an optional aft boarding door to close the opening.

In one embodiment, the deck 60 of the cockpit extension 200 is adjacent to the afterdeck, such that the deck is in close proximity to, abuts against, or is continuous with the afterdeck 10 and the deck 60 is accessible from the afterdeck. In a further embodiment, the deck of the cockpit extension is coplanar with the afterdeck 10, such that, when side-by-side, they form a substantially flat area as seen in, for example, FIGS. 1, 3, 4, 5A, and 7. In other embodiments, the deck of the cockpit extension is not coplanar with the afterdeck. In such embodiments, the deck of the cockpit extension can be above or below the afterdeck as seen in FIG. 5B. For example, there can be one or more steps that lead to the deck from the afterdeck. In a particular embodiment, the deck of the cockpit extension tilts upward in the aft direction. In a further embodiment, there is minimal obstruction between the afterdeck and the cockpit extension, such that they form a continuous area and the deck of the cockpit extension is directly accessible from the afterdeck.

In an embodiment, the sides 25 of the boat, which can include an inner bulkhead, freeboard, and gunwale, do not extend fully around the deck extension. The sides of the boat extend partially to the cockpit extension, such as shown, for example, in FIGS. 4 and 7. With this embodiment, the boat sides can extend partially around the cockpit extension, such that a portion of the cockpit extension aft of the aft-most surface of each outboard engine has sides. This can provide an entryway 110 onto the boat by way of the cockpit extension. Optionally, raised rails or railings can accompany the sides of the boat in extending around portions of the periphery of the deck of the cockpit extension.

Figure 11:
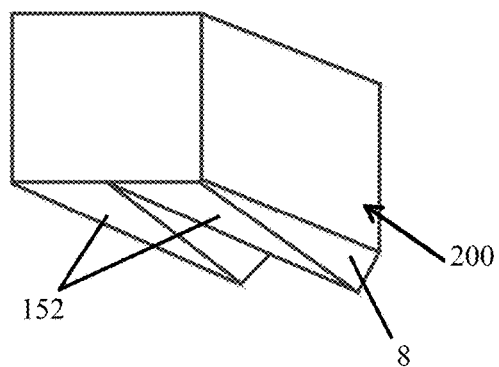
FIG. 11 illustrates an example of an embodiment with a lower surface with more than one reverse incline plane.
Figure 12:
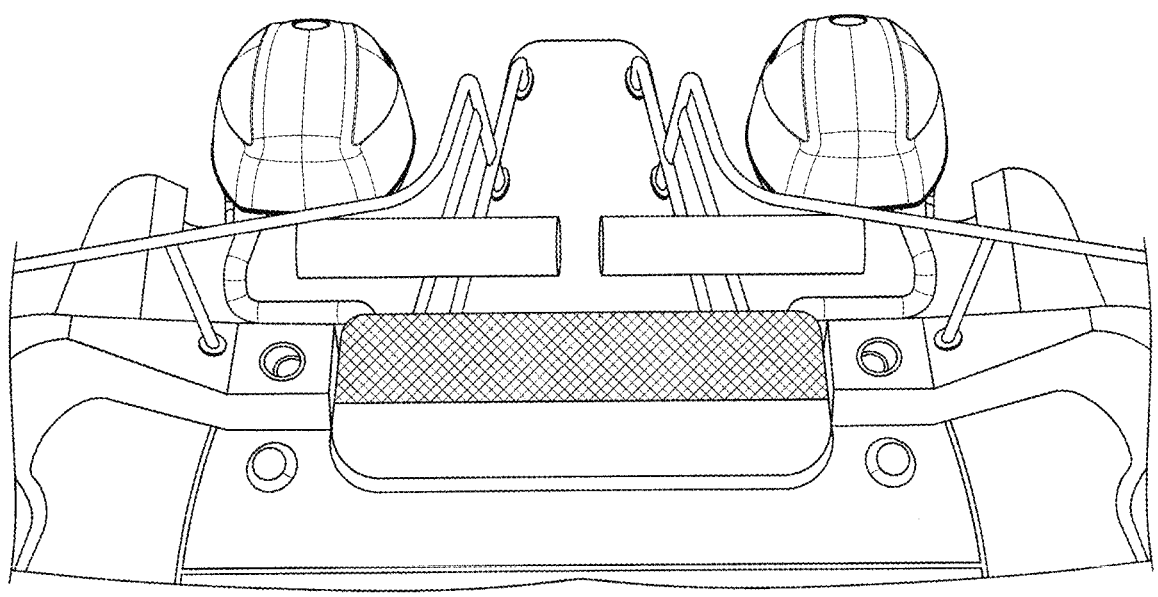
FIG. 12 is a photograph of a prior art vessel—Yamaha SR320FB.
Figure 13:
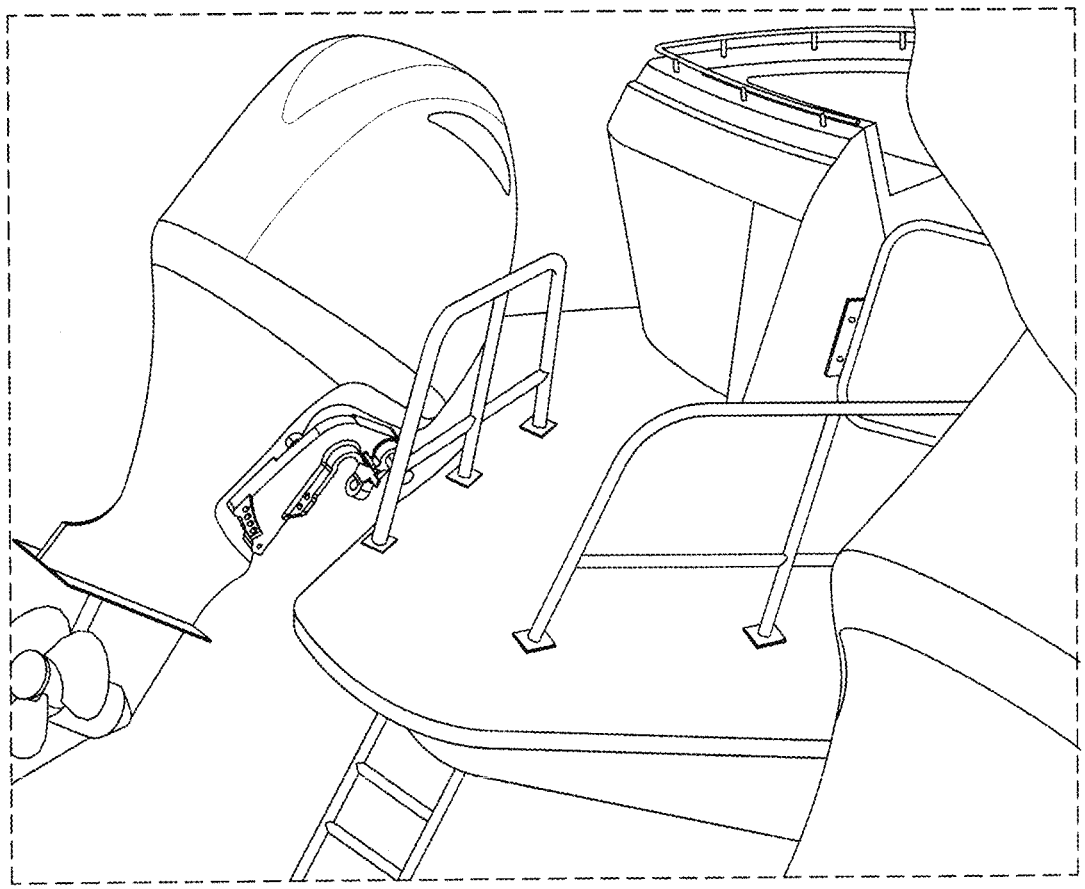
FIG. 13 is a photograph of a prior art vessel—Yamaha SR330
Figure 14:
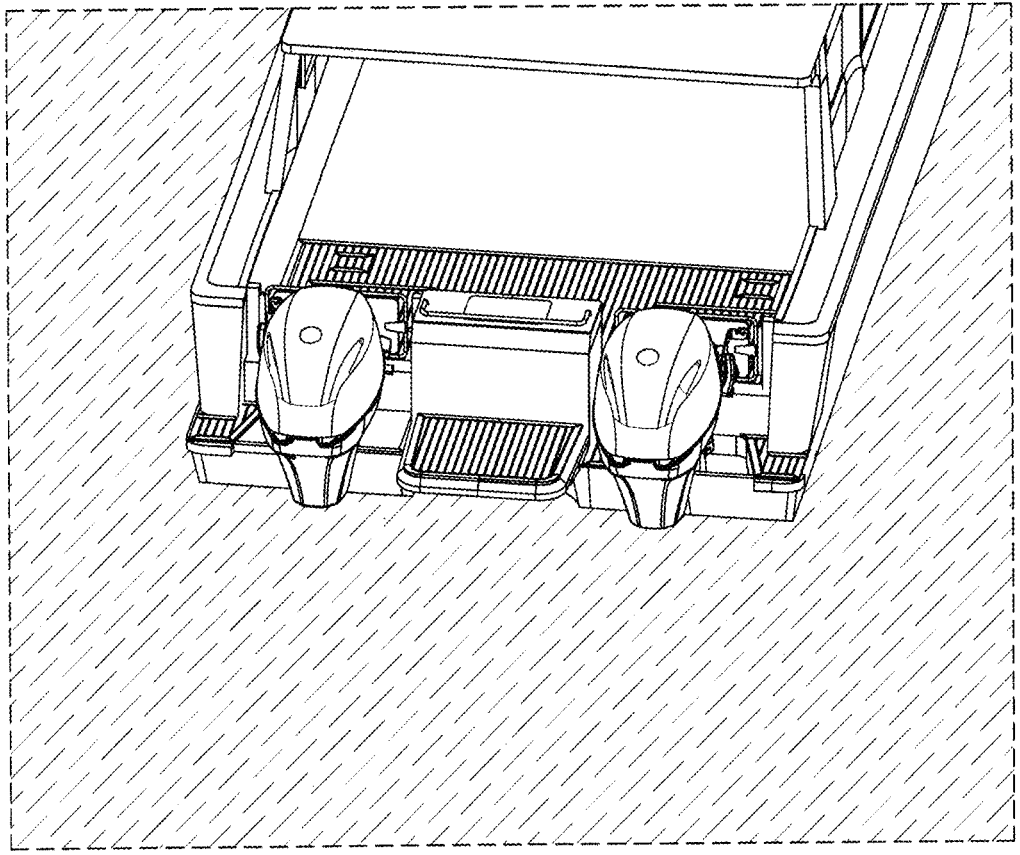
FIG. 14 is a photograph of a prior art vessel—Power Play
Figure 15:
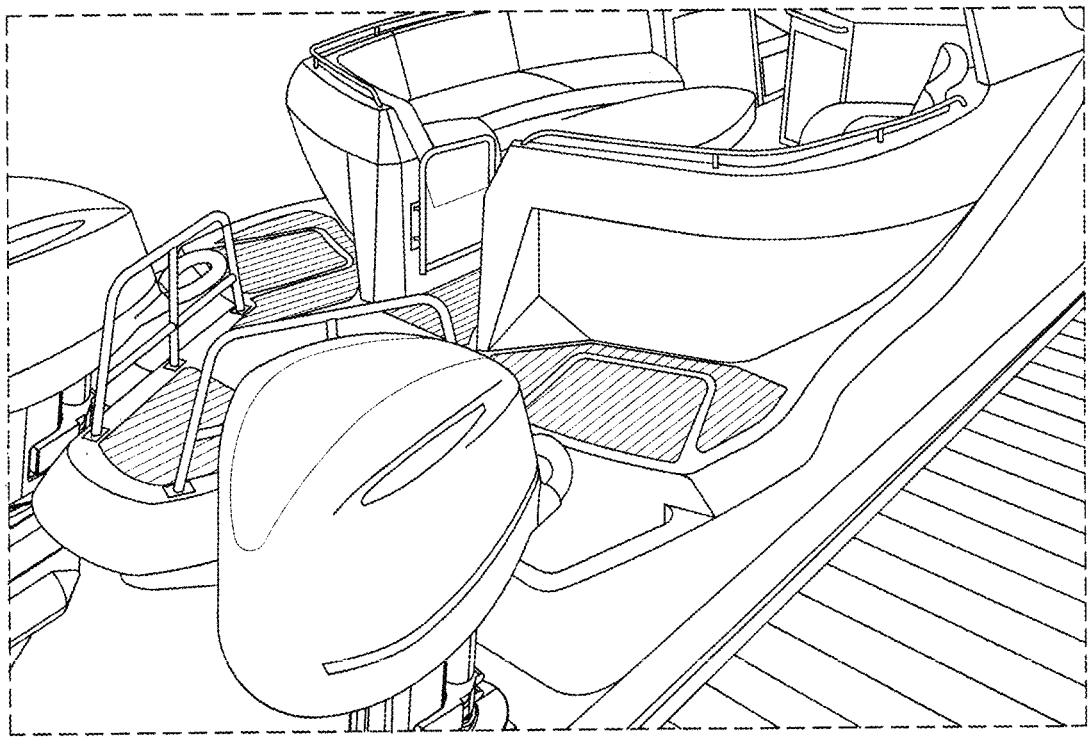
FIG. 15 is a photograph of a prior art vessel—Yamaha SR330

In other embodiments, the sides of the boat 25 extend entirely around the periphery 52 of the deck of the cockpit extension. In these embodiments, the deck platform can have sides, similar to those of the boat, and be fully enclosed, such as shown, for example, in FIGS. 10 and 11. In other embodiments, for example as shown in FIGS. 1-3 and 5, an entryway 110 can be formed in the cockpit extension sides and a door 116 can be used to close the entryway, thus providing the fully enclosed cockpit extension and an entryway 110. The boat sides and gunwales often have attachments, such as cleats, rod holders, rails, etc. In certain embodiments, the sides of a cockpit extension are amenable to receiving or being replaced by such attachments.

The boat waterline 15 refers to the level on the hull 13 to which the water rises or the level to which the boat sits in the water. The viewable portion of the hull above the waterline can have various markings and coloration. The hull portion below the waterline is usually not visible or only partially visible. On a V-hull boat, the hull portion below the waterline typically has at least a centerline keel and can have one or more types of "strakes" 17, which run along the length of the boat, as shown, for example, in FIG. 9B.

In addition, a cockpit extension can be utilized on any boat powered with a plurality of outboard engines. Such boats typically range in size from 15 feet to over 65 feet in length. Where the cockpit extension is located on the transom plane 20, relative to the engines, can depend upon the size of the boat and the number and placement of the engines. Likewise, whether the under-face 70 on the bottom side of the cockpit extension is above, at, or below the water line can depend upon the size of the boat and the size of the boat transom 255.

Figure 6A:
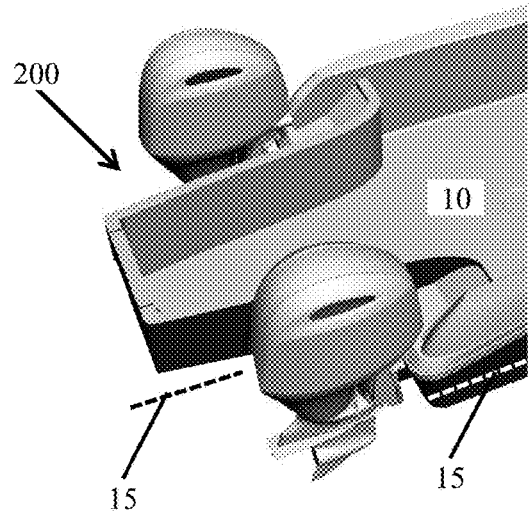
FIG. 6A is an illustration showing the stern of a boat with a cockpit extension, according to embodiments of the subject invention. In this embodiment, the under-face of the cockpit extension is above the water line of the boat, as indicated by the dashed lines.
Figure 6B:
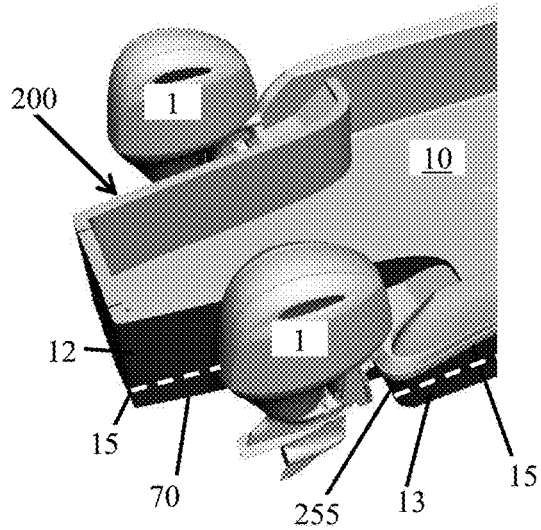
FIG. 6B is an illustration showing the stern of a boat with a cockpit extension, according to embodiments of the subject invention. In this embodiment, the under-face of the cockpit extension is below the water line of the boat, as indicated by the dashed lines.
Figure 8A:
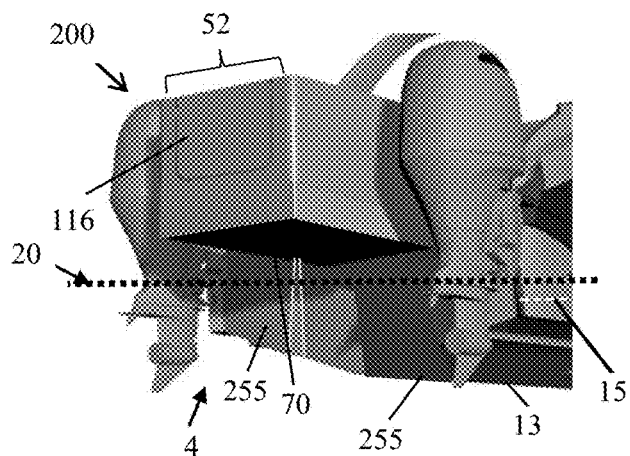
FIG. 8A illustrates the stern of a boat with an embodiment of a cockpit extension with an under-face above the water line of the boat.
Figure 8B:
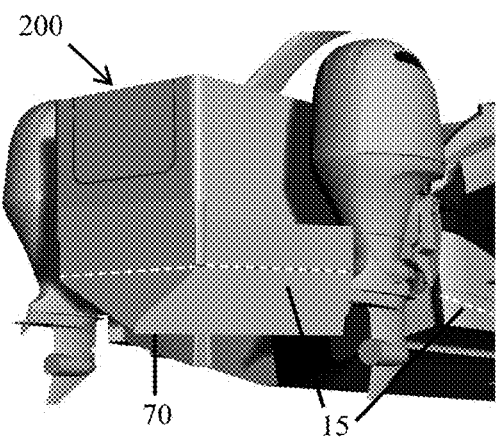
FIG. 8B illustrates the stern of a boat with an embodiment of a cockpit extension with an under-face below the water line of the boat.

In an embodiment, a cockpit extension 200 has an under-face 70 that is above the boat waterline 15. In a further embodiment, the cockpit extension is sufficiently above the waterline that when the boat is traveling faster than at idle speed, the cockpit extension and under-face are inhibited from extending below the water surface. Preferably, the under-face, being above the waterline, is smooth. However, it can have one or more mild strakes to slake away water that may splash up from the back of the boat. FIGS. 1, 6, 8 illustrate examples of cockpit extensions with the under-face above the boat water line.

Figure 9A:
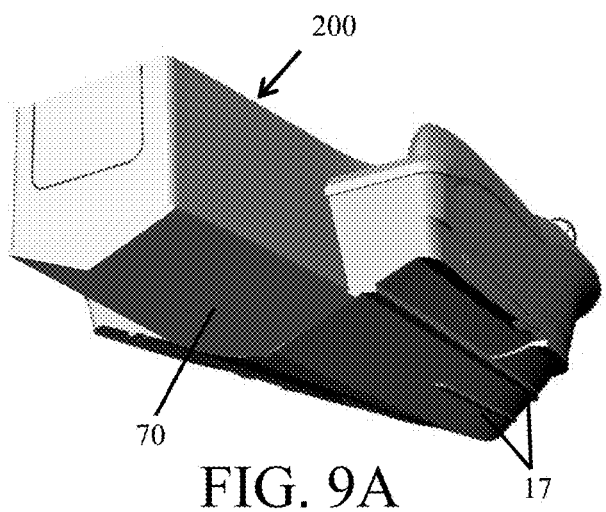
FIG. 9A illustrates the stern of a boat with an embodiment of a cockpit extension having an under-face running surface incorporated with the lower hull of the boat.
Figure 9B:
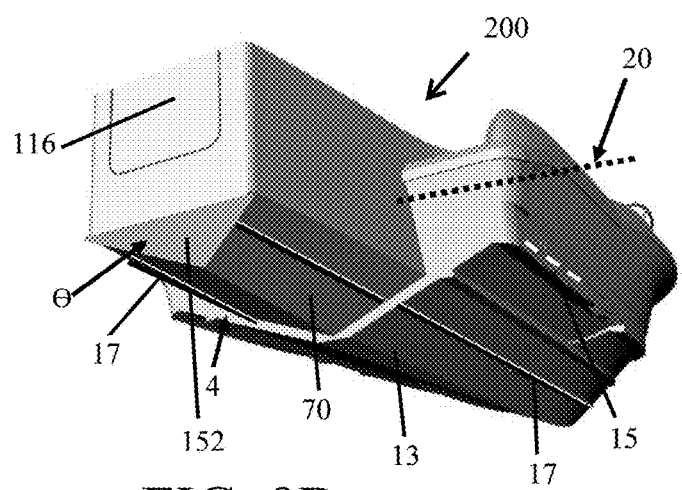
FIG. 9B illustrates the stern of a boat with an embodiment of a cockpit extension having an under-face running surface with strakes incorporated with the lower hull of the boat.
Figure 10A:
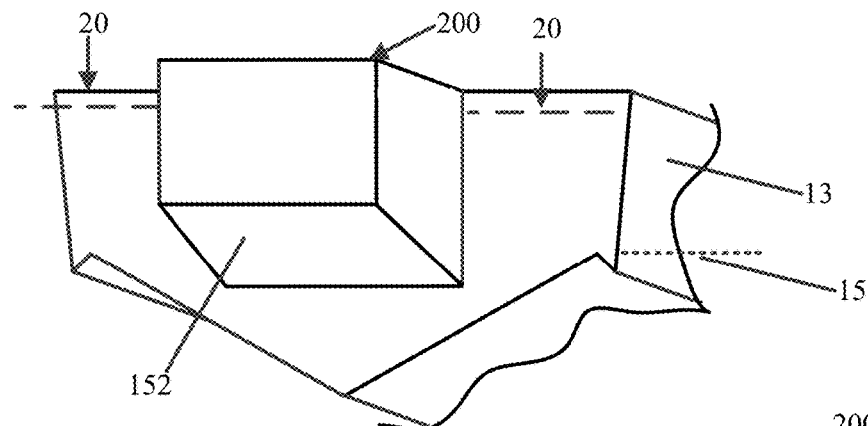
FIG. 10A illustrates the stern of a boat with an embodiment of a cockpit extension arranged approximately at the water line of the boat and having a flat inclined surface to raise the deck extension above the water line during backdown.
Figure 10B:
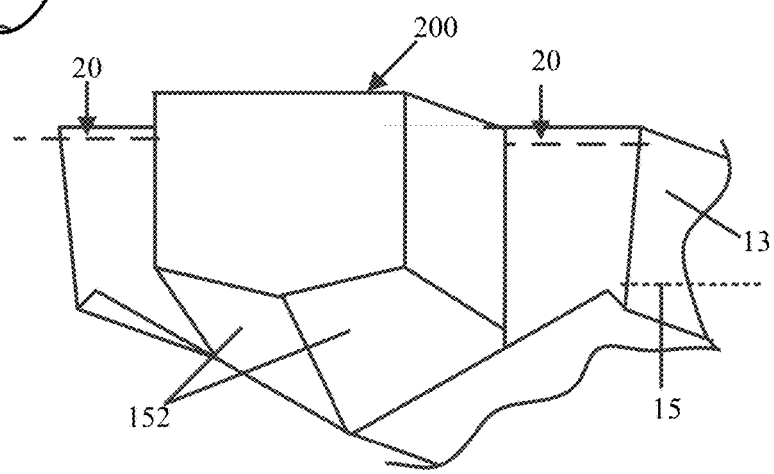
FIG. 10B illustrates the stern of a boat with an embodiment of a cockpit extension arranged approximately at the water line of the boat and having a V-shaped inclined surface meeting the hull running surface to raise the deck extension above the water line during backdown.
Figure 10C:
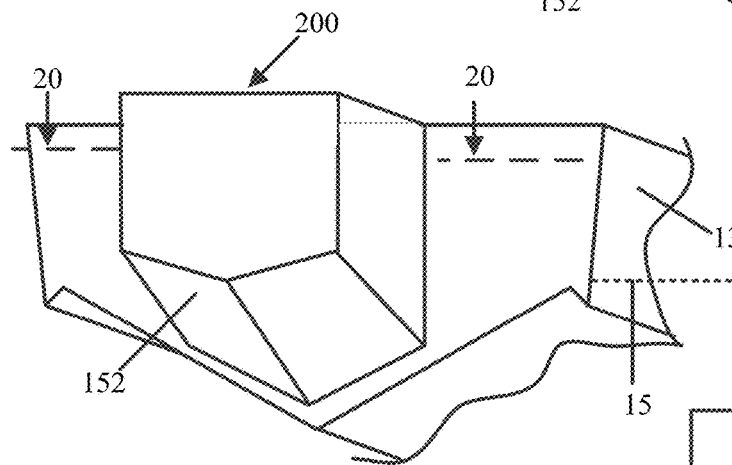
FIG. 10C illustrates the stern of a boat with an embodiment of a cockpit extension arranged approximately at the water line of the boat and having a V-shaped inclined surface meeting the hull transom to raise the deck extension above the water line during backdown.

An alternative embodiment has a cockpit extension 200 with a under-face 70 that is level with or approximately level with the boat water line 15. Thus, the under-face can contact water when the boat is at rest or in motion. In an embodiment, the under-face is flat. Alternatively, the under-face can have one or more strakes 17 (FIG. 9B). In a further embodiment, the boat hull 13 and the under-face 70 of a cockpit extension can be integrated, such that the under-face and hull form a continuous or substantially continuous surface. For example, the boat hull can extend to the bottom side of the cockpit extension. One example of this is shown in FIG. 9A. In a further embodiment, the boat hull 13 and the under-face 70 of a cockpit extension can be integrated, such that the under-face and hull form a continuous or substantially continuous or slightly stepped surface with one or more mild strakes to slake away water that may splash up from the back of the boat. For example, the boat hull and strakes can extend to the bottom side of the cockpit extension. One example of this is shown in FIG. 9B.

When a conventional boat is going in reverse, or "backing down," it pushes water against the transom. Depending on how fast the boat is backing down, the stern can exhibit a "digging in" phenomenon, where the stern is pushed into the water causing water to "pile up" on the boat transom 255. This can slow the backing down boat and, in some cases, cause water to come over the boat transom, which can be dangerous. A cockpit extension having an under-face 70 that is at least partially level with or approximately level with the boat water line 15 provides an advantage to a boat. In an embodiment, the under-face can have a lower surface 8 that gathers water under the cockpit extension while backing down and, thus, to the bottom side 4 of the boat during back down. This can inhibit the stern from digging in and improve the backing down procedure.

In an embodiment, the under-face 70 of a cockpit extension 200 has a lower surface 8 that is in line with or at least partially below the boat water line 15. In a further embodiment, the lower surface of the cockpit extension comprises a reversed inclined plane. With this configuration, the lower surface forms a reverse incline surface 152 where the aft end of the lower surface is higher than the more forward end (at the transom plane 20) that is directed towards or below the water line of the boat. This provides a wedge-like under-face directed at or in the water at its forward end.

A running surface can be positioned on the under-face, between the stern of the cockpit extension and the transom plane 20 (FIGS. 9A and 9B). Thus, a running surface can, but does not have to, encompass the entire under-face of the cockpit extension.

Examples of various lower surfaces 8 are shown in FIGS. 7, and 9-11. There can be more than one reverse incline plane 152 on the cockpit extension lower surface, as shown, for example, in FIG. 11. As the boat is backing down, the lower surface can deflect water down and under the boat hull. The force of the deflected water on a reverse incline surface can cause the stern to rise and inhibit water from piling up on the transom of the cockpit extension. The angle θ of the inclined surface can determine how and where water is deflected. The angle θ of a reverse inclined surface relative to the horizontal can be at least 5°, 10°, 15°, 20°, 25° 30°, 35°, 40°, 45°, 50°, 55°, 60°, 65°, 70°, 75°, or 80° or an angle in a range between any two of the listed values.

In a particular embodiment, where the under-face 70 of a cockpit extension 200 is integrated with the boat hull, a lower surface running surface 8 is arranged towards the stern of the cockpit extension (FIGS. 9A and 9B). As described above, the open angle θ of the reverse inclined surface 152 is directed towards the transom plane 20.

Outboard engine powered boats are popular with boaters due to their simplicity, weight savings over other types of power systems for boats, and the ability to tilt completely out of the water, which provides anti-corrosion benefits. As manufacturing and material technologies improve, the size of the boats increases, which necessitates more outboard engines on a boat to achieve greater speed. The cockpit extension embodiments of the subject invention provide an advantageous improvement to boats with multiple outboard engines by replacing the deck area utilized by the engines. Allowing occupants to safely utilize the cockpit space currently wasted by the conventional outboard engine V hull designs A cockpit extension can provide more space for more activities without negatively affecting the operation of the engines or the boat and with the addition of a running surface can improve certain aspects of the boat design.

All patents, patent applications, provisional applications, and other publications referred to or cited herein are incorporated by reference in their entirety, including all figures, to the extent they are not inconsistent with the explicit teachings of this specification. Additionally, the entire contents of the references cited within the references cited herein are also entirely incorporated by reference.

The examples and embodiments described herein are for illustrative purposes only and that various modifications or changes in light thereof will be suggested to persons skilled in the art and are to be included within the spirit and purview of this application.

Finally, any reference in this specification to "one embodiment," "an embodiment," "example embodiment," "further embodiment," "alternative embodiment," etc., is for literary convenience. The implication is that any particular feature, structure, or characteristic described in connection with such an embodiment is included in at least one embodiment of the invention. The appearance of such phrases in various places in the specification does not necessarily refer to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

The invention claimed is:

1. A cockpit extension, configured to be utilized on a boat with at least two outboard engines supported on a transom and an afterdeck forward of the transom, comprising:
   a topside deck with a periphery;
   a gunwale and inner bulkhead extending upward from at least a portion of the periphery of the topside deck; and
   an under-face beneath the topside deck,
   wherein the cockpit extension is attached to or is integral with the transom of the boat, extends between the two outboard engines, and an aft-most point of the topside deck of the cockpit extension extends aft of an aft-most surface of each of the outboard engines.

2. The cockpit extension according to claim 1, wherein the topside deck is not co-planar with the afterdeck.

3. The cockpit extension according to claim 1, wherein the gunwale and inner bulkhead are integrated with a gunwale and inner bulkhead of the boat.

4. The cockpit extension according to claim 1, comprising at least one of a gunwale, outer freeboard, and inner bulkhead that is respectively integrated with at least one of a gunwale, outer freeboard, and inner bulkhead of the boat.

5. The cockpit extension according to claim 1, wherein the gunwale and inner bulkhead of the cockpit extension extends entirely around the periphery of the topside deck except for a portion that is adjacent to or integral with the afterdeck.

6. The cockpit extension according to claim 4, further comprising an entryway in the at least one gunwale, outer freeboard, or inner bulkhead of the cockpit extension.

7. The cockpit extension according to claim 6, further comprising a door configured within the entryway.

8. The cockpit extension according to claim 4, comprising a running surface on the under-face.

9. A boat having a transom configured to support two or more outboard engines, comprising:
   an afterdeck forward of the transom;
   a V-shaped hull;
   a cockpit extension operably connected to the transom, comprising,
      a topside deck with a periphery,
      a gunwale and inner bulkhead extending upward from at least a portion of the periphery of the topside deck, and
      an under-face beneath the topside deck;
   wherein the cockpit extension is operably connected to the transom between the two or more engines and an aft-most point of the gunwale extends aft of an aft-most surface of each of the outboard engines.

10. The boat according to claim 9, wherein the cockpit extension comprises at least one of a gunwale, outer freeboard, and inner bulkhead that is respectively integrated with at least one of a gunwale, outer freeboard, and inner bulkhead of the boat.

11. The boat according to claim 10, wherein the at least one gunwale, outer freeboard, or inner bulkhead of the cockpit extension extends entirely around the periphery of the topside deck except for a portion that is adjacent to or integral with the afterdeck.

12. The boat according to claim 10, further comprising an entryway in the at least one gunwale, outer freeboard, or inner bulkhead of the cockpit extension.

13. The boat according to claim 12, further comprising a door configured within the entryway.

14. The boat according to claim 10, wherein the under-face is above a waterline of the boat.

15. The boat according to claim 9, wherein the topside deck is not co-planar with the afterdeck.

16. The boat according to claim 10, further comprising a running surface on the under-face.

17. A method for increasing an afterdeck area of a boat comprising:
operably connecting to an open transom area between outboard engine mounting points on a transom of the boat a cockpit extension comprising:
a topside deck with a periphery,
at least one of a gunwale, an outer freeboard, and an inner bulkhead extending upward from at least a portion of the periphery of the topside deck, and
an under-face beneath the topside deck;
such that the topside deck is accessible from the afterdeck area; and arranging at least one outboard engine to port and starboard sides of the boat, respectively, such that the cockpit extension is between the outboard engines, and an aft-most point of the topside deck extends aft of an aft-most surface of each of the outboard engines.

18. The method according to claim 17, further comprising incorporating the at least one of a gunwale, outer freeboard, and inner bulkhead of the cockpit extension with a respective at least one of a gunwale, outer freeboard, and inner bulkhead of the boat.

19. The method according to claim 18, wherein the under-face is above a water line of the boat.

20. The method according to claim 18, further comprising operably connecting the under-face with a hull of the boat.

* * * * *